United States Patent [19]

Pavlica et al.

[11] Patent Number: 5,219,807

[45] Date of Patent: Jun. 15, 1993

[54] BURNED HIGH PURITY REFRACTORIES WITH LOW SOLUBLE CHROMIUM

[75] Inventors: Stanley R. Pavlica, Irwin; Dwight S. Whittemore, Bethel Park, both of Pa.

[73] Assignee: Indresco Inc., Dallas, Tex.

[21] Appl. No.: 722,570

[22] Filed: Jun. 27, 1991

[51] Int. Cl.$^5$ .............................................. C04B 35/42
[52] U.S. Cl. ..................................... 501/132; 501/99; 501/100; 501/117
[58] Field of Search ................. 501/99, 100, 110, 117, 501/115, 132, 127

[56] References Cited

U.S. PATENT DOCUMENTS

| | | | |
|---|---|---|---|
| 3,288,616 | 11/1966 | Bowman | 501/132 X |
| 3,361,584 | 1/1968 | Mayberry | 501/110 |
| 3,663,248 | 5/1972 | Umeya et al. | 501/132 X |
| 3,773,531 | 11/1973 | Manigault | 501/132 X |
| 4,099,949 | 7/1978 | Olds | 65/17 |
| 4,115,133 | 9/1978 | Künkole et al. | 501/110 X |
| 4,158,569 | 6/1979 | Brothers et al. | 106/66 |
| 4,383,045 | 5/1983 | Nagle et al. | 501/117 X |
| 4,407,970 | 10/1983 | Komatsu et al. | 501/97 |
| 4,568,652 | 2/1986 | Petty, Jr. | 501/127 |
| 4,647,547 | 3/1987 | Singh et al. | 501/103 |
| 4,724,224 | 2/1988 | Staley, Jr. et al. | 501/132 |
| 4,792,538 | 12/1988 | Pavlica et al. | 501/127 |
| 4,863,516 | 9/1989 | Mosser et al. | 106/14.12 |
| 5,106,795 | 4/1992 | Drake et al. | 501/132 X |

FOREIGN PATENT DOCUMENTS

| | | |
|---|---|---|
| 556125 | 5/1977 | U.S.S.R. |
| 821434 | 4/1981 | U.S.S.R. |
| 872512 | 10/1981 | U.S.S.R. |
| 1081140 | 3/1984 | U.S.S.R. |
| 1085961 | 4/1984 | U.S.S.R. |

*Primary Examiner*—Karl Group

[57] ABSTRACT

A burned, high-purity refractory, specifically a chrome-alumina, alumina-chrome and picrochromite composition, which contains less than 5 ppm total soluble chromium. Such products are obtained by adding to the starting mix less than 5 wt. % (often less than 3 wt. %) zircon, titania, molybdic oxide, boric acid, carbon black, or silica.

43 Claims, No Drawings

BURNED HIGH PURITY REFRACTORIES WITH LOW SOLUBLE CHROMIUM

BACKGROUND OF THE INVENTION

This invention relates to chromium containing refractories and, more particularly, it concerns an improved, high purity, burned refractory with low levels of soluble chromium. The compositions of the present invention are made from high purity, synthetic raw materials. Typically, these materials are at least 98% pure.

Chromium in its various oxide forms is a useful constituent of refractories because of its high melting point and its relative inertness when in contact with corrosive slags, gases, and molten metals. The main forms of chromium used in refractories are the mineral chromite—a complex oxide consisting of about 30–60% $Cr_2O_3$—and pigment-grade chromium oxide ($Cr_2O_3$). Under certain conditions, the acid form of chromium, chromic acid ($CrO_3$), can form from these materials. After use, routine disposal of these refractories is of concern since $CrO_3$, (chromium VI) can be dissolved by water. Simple leaching of used chrome-bearing refractories by rain water or ground water may dissolve $CrO_3$ present in the refractory.

The U.S. Environmental Protection Agency has issued test methods to determine the level of water soluble chromium from various materials and has specified a current (Yr. 1990) maximum allowable level of total water soluble chromium (all valence states of chromium) to be no more than 5 mg/L (or 5 ppm). The test methods used to determine soluble chromium have evolved from the earliest method, the EP Method (Extraction Procedure), to the present method, the TCLP Method (Toxicity Characteristic Leaching Procedure—Method 1311).

Since the EPA guidelines were announced, producers and consumers of chrome-bearing materials have been involved with determining the level of soluble chromium in their products. It is now apparent that different products containing similar levels of total chromium can differ in their soluble chromium levels. Therefore, a good correlation between total chromium and soluble chromium is not immediately apparent. In light of the foregoing, there is a need for an improved refractory and method having a decreased level of soluble chromium, and in particular, a burned, high-purity refractory having a level of soluble chromium reduced to below 5 ppm.

SUMMARY OF THE INVENTION

In accordance with the present invention, it has been unexpectedly discovered that minor additions of fine titania, boric acid, carbon black, silica, zircon and/or molybdic oxide to burned, high-purity chrome-containing refractories are effective in lowering the soluble chromium level of these compositions to acceptable values. This discovery is noteworthy, since it allows control of soluble chromium in a variety of chrome-bearing products. For example, products containing varying levels of soluble chromium may now be made to contain low, acceptable levels of soluble chromium.

In accordance with an exemplary embodiment of the present invention, a burned 77% chromia/22% alumina brick, which otherwise could have soluble chrome levels well in excess of 5 ppm, has a reduced soluble chromium level below the mandated 5 ppm maximum by either adding about 2 wt. % titania, about 1.5 wt. % boric acid, about 1 wt. % carbon black, about 2 wt. % zircon, about 1 wt. % silica, or more than 2 wt. % molybdic oxide. These amounts are meant to be illustrative rather than restrictive since it is readily apparent that compositions with higher amounts of soluble chromium may require larger amounts of these additives in order to reduce the level of soluble chromium to acceptable levels.

Accordingly, a principal object of the present invention is to provide a burned, high-purity refractory with low levels of soluble chromium. Another and more specific object of the invention is the provision of a method of reducing the soluble chromium levels of burned, high-purity refractories. Other objects and further scope of applicability of the present invention will become apparent from the detailed description to follow taken in conjunction with the accompanying table.

DETAILED DESCRIPTION OF THE PREFERRED EMBODIMENTS

Some commercially available chromia-alumina bricks have levels of soluble chromium that exceed the EPA guideline of 5 ppm or less. In accordance with the present invention, it is possible to produce such a refractory with an acceptable level of soluble chromium by adding small amounts of titania, boric acid, carbon black, silica, zircon and/or molybdic oxide to the base mix.

As shown in Table I, as little as 2 wt. % zircon decreases the soluble chromium content of a burned chromia-alumina shape from well over 5 ppm to less than 1 ppm. Two percent or less of titania, boric acid, carbon black, or fine silica appeared to be just as effective. The data indicated that perhaps more than 2 wt. % molybdic oxide would be needed to fall safely below the mandated guideline of 5 ppm soluble chromium.

TABLE I

| | | | | | | | | | |
|---|---|---|---|---|---|---|---|---|---|
| Brick Type: | \multicolumn{8}{c|}{Burned Chrome-Alumina Brick (77% $Cr_2O_3$/22% $Al_2O_3$)} | Comparative Data 1990 EPA Guideline |
| Mix: | A | A-1 | B | C | D | E | F | G | |
| Additive: | None | None | 2% Zircon 600 mesh | 2% Titania pigment grade | 2% $MoO_3$ fines | 1.5% Boric Acid | 1% Carbon Black | 1% Submicron Silica | |
| Firing: | Unfired | | | | \multicolumn{4}{c|}{Burned Shapes} | | |
| TCLP Toxicity Test Hexavalent Chromium (Cr), mg/L: | 5.8 | 11.0 | <0.01 | 0.18 | <0.01 | 0.17 | 0.48 | <0.01 | |
| Total Chromium | 18.0 | 11.0 | 0.78 | 1.7 | 5.7 | 0.26 | 2.2 | 1.0 | 5.0 (max.) |

TABLE I-continued

Effect of Various Additives on Soluble Chromium (Cr), mg/L:

The above description clearly illustrates the pronounced effect that minor additions of silica, zircon, boric acid, titania, carbon black, and molybdic oxide have on the soluble chromium content of fired chromia-alumina refractories. It is obvious that these additions would be effective in other burned high purity chrome-bearing refractories made from non-ore materials such as picrochromite (79% $Cr_2O_3$/21% MgO), high-purity alumina-chromia compositions, or compositions within the system $MgO-Al_2O_3-Cr_2O_3$.

It is conjectured that chromium 3+ (the most stable form of chromium) may convert to Cr 6+ in a high temperature environment, such as in a kiln. This conversion appears to be accelerated in the presence of an alkali or an alkaline earth compound. Chromium 6+ compounds tend to be water soluble and are suspected of causing toxic effects in biological species.

The above example clearly shows that additions of zircon in accordance with the present invention tends to decrease the amount of soluble chromium. Possibly, zircon has a stronger affinity for alkaline earth compounds (such as CaO) than chromium. Therefore, chromium in the presence of lime and zircon tends to stay in the stable insoluble $Cr_2O_3$ form.

In accordance with another embodiment of the present invention, molybdic oxide was also found to be effective in decreasing the level of soluble chromium. $MoO_3$ appears to be effective because it is stable in the +6 state, it is chemically similar to $CrO_3$, and it may have a higher affinity for alkalies or alkaline earth compounds than chromium.

In accordance with still another embodiment of the present invention, boric acid and carbon black were also found to be effective in decreasing the level of soluble chromium. Both of these compounds are more electronegative than chromium and tend to be acid in nature. Because of this, they may react with alkali chromate compounds. In addition, carbon is a well known reducing agent and could reduce Cr 6+ to Cr 3+.

In accordance with yet another embodiment of the present invention, titania and silica were also found to be effective in decreasing the level of soluble chromium. Both of these oxides may be acidic and hence could enter into an acid/base reaction with alkali chromates.

Furthermore, additions of silica, zircon, boric acid, titania, carbon black and molybdic oxide can be used not only to lower the soluble chromium content of unused refractories, but may also be useful in decreasing the soluble chromium content of used refractories. For example, used chromium-bearing refractories could be crushed, mixed with the aforementioned additives, and burned to reduce their soluble chromium content.

Based upon these and other considerations, various forms of other elements theoretically could be used to decrease the levels of water soluble chromium. These elements are: S, W, U, Ba, V, Nb, Ta, Fe, Eu, Mn, Tc, N, Cl, Se, Br, I, Re, Ru, Os, P, As, Sb, Te and Bi.

Thus, it will be appreciated that as a result of the present invention, a chromia-alumina brick having acceptable levels of soluble chromium is provided by which the principal object and others are completely fulfilled. It is contemplated and will be apparent to those skilled in the art from the foregoing description and accompanying table that variations and/or modifications of the disclosed embodiment may be made without departure from the invention. For example, it is suspected that zirconia ($ZrO_2$) would also be effective in lowering the level of soluble chromium.

Accordingly, it is expressly intended that the foregoing description and accompanying table are illustrative of the preferred embodiments only, not limiting, and that the true spirit and scope of the present invention be determined by reference to the appended claims.

What is claimed is:

1. A method of lowering the soluble chromium content of a burned refractory to less than 5 ppm total soluble chromium as defined by the Environmental Protection Agency's Test Method 1311, comprising: (a) preparing a starting mix consisting essentially of an at least 98% pure synthetic raw material selected from the group of chrome-alumina, alumina-chrome and picrochromite, (b) combining an amount up to 10 wt. % of an additive selected from the group of fine silica, molybdic oxide, zircon, titania, boric acid, carbon black, and combinations thereof with the starting mix to form a refractory mix, and (c) shaping and firing the refractory mix.

2. The method of claim 1, wherein up to 1 wt. % of the additive is combined with the starting mix.

3. The method of claim 1, wherein the additive is sized −65 mesh.

4. The method of claim 3, wherein the additive is sized −325 mesh.

5. A method of lowering the soluble chromium content of a burned refractory to less than 5 ppm total soluble chromium as defined by the Environmental Protection Agency's Test Method 1311, comprising: (a) preparing a starting mix consisting essentially of an at least 98% pure synthetic raw material selected from the group of chrome-alumina, alumina-chrome and picrochromite, (b) combining an amount up to 10 wt. % of an additive of molybdic oxide ($MoO_3$) with the starting mix to form a refractory mix, and (c) shaping and firing the refractory mix.

6. The method of claim 5, wherein up to 5 wt. % of the additive is combined with the starting mix.

7. The method of claim 5, wherein the additive is sized −65 mesh.

8. The method of claim 7, wherein the additive is sized −325 mesh.

9. A method of lowering the soluble chromium content of a burned refractory to less than 5 ppm total soluble chromium as defined by the Environmental Protection Agency's Test Method 1311, comprising (a) preparing a starting mix consisting essentially of an at least 98% pure synthetic raw material selected from the group of chrome-alumina, alumina-chrome and picrochromite, (b) combining an amount up to 10 wt. % of an additive of zircon ($ZrO_2.SiO_2$) with the starting mix to form a refractory mix, and (c) shaping and firing the refractory mix.

10. The method of claim 9, wherein up to 2 wt. % of the additive is combined with the starting mix.

11. The method of claim 9, wherein the additive is sized −65 mesh.

12. The method of claim 11, wherein the additive is sized −325 mesh.

13. A method of lowering the soluble chromium content of burned refractory to less than 5 ppm total soluble chromium as defined by the Environmental Protection Agency's Test Method 1311, comprising (a) preparing a starting mix consisting essentially of an at least 98% pure synthetic raw material selected from the group of chrome-alumina, alumina-chrome and picrochromite, (b) combining an amount up to 10 wt. % of an additive of titania ($TiO_2$) with the starting mix to form a refractory mix, and (c) shaping and firing the refractory mix.

14. The method of claim 13, wherein up to 3 wt. % of the additive is combined with the starting mix.

15. The method of claim 13, wherein the additive is sized −65 mesh.

16. The method of claim 15, wherein the additive is sized −325 mesh.

17. A method of lowering the soluble chromium content of burned refractory to less than 5 ppm total soluble chromium as defined by the Environmental Protection Agency's Test Method 1311, comprising (a) preparing a starting mix consisting essentially of an at least 98% pure synthetic raw material selected from the group of chrome-alumina, alumina-chrome and picrochromite, (b) combining an amount up to 10 wt. % of an additive of boric acid ($H_3BO_3$) with the starting mix to form a refractory mix, and (c) shaping and firing the refractory mix.

18. The method of claim 17, wherein up to 2 wt. % of the additive is combined with the starting mix.

19. The method of claim 17, wherein the additive is sized −65 mesh.

20. The method of claim 19, wherein the additive is sized −325 mesh.

21. A method of lowering the soluble chromium content of burned refractory to less than 5 ppm total soluble chromium as defined by the Environmental Protection Agency's Test Method 1311, comprising (a) preparing a starting mix consisting essentially of an at least 98% pure synthetic raw material selected from the group of chrome-alumina, alumina-chrome and picrochromite, (b) combining an amount up to 10 wt. % of an additive of carbon black with the starting mix to form a refractory mix, and (c) shaping and firing the refractory mix.

22. The method of claim 21, wherein up to 2 wt. % of the additive is combined with the starting mix.

23. The method of claim 21, wherein the additive is sized −65 mesh.

24. The method of claim 23, wherein the additive is sized −325 mesh.

25. A burned, chrome-alumina, alumina-chrome, or picrochromite refractory composition having less than 5 ppm total soluble chromium as defined by the Environmental Protection Agency's Test Method 1311 made in accordance with the method of claim 1.

26. A burned refractory composition having less than 5 ppm total soluble chromium as defined by Environmental Protection Agency Test Method 1311, comprising a starting mix consisting essentially of an at least 98% pure, synthetic, chrome-alumina, alumina-chrome or picrochromite wherein the starting mix is combined with an amount up to 10 wt. % fine molybdic oxide.

27. The burned refractory composition of claim 26, wherein the starting mix is combined with up to 5 wt. % fine molybdic oxide.

28. The refractory composition of claim 26, wherein the molybdic oxide is sized −65 mesh.

29. The refractory composition of claim 28, wherein the molybdic oxide is sized −325 mesh.

30. A burned refractory composition having less than 5 ppm total soluble chromium as defined by Environmental Protection Agency Test Method 1311, comprising a starting mix consisting essentially of an at least 98% pure, synthetic, chrome-alumina, alumina-chrome or picrochromite wherein the starting mix is combined with an amount up to 10 wt. % boric acid ($H_3BO_3$).

31. The burned refractory composition of claim 30, wherein the starting mix is combined with up to 2 wt. % boric acid.

32. The refractory composition of claim 30, wherein the boric acid is sized −65 mesh.

33. The refractory composition of claim 32, wherein the boric acid is sized −325 mesh.

34. A burned refractory composition having less than 5 ppm total soluble chromium as defined by Environmental Protection Agency's Test Method 1311, comprising a starting mix essentially of an at least 98% pure, synthetic, chrome-alumina, alumina-chrome or picrochromite wherein the starting mix is combined with an amount up to 10 wt. % carbon black.

35. The burned refractory composition of claim 34, wherein the starting mix is combined with up to 2 wt. % carbon black.

36. The refractory composition of claim 34, wherein the carbon black is sized −65 mesh.

37. The refractory composition of claim 36, wherein the carbon black is sized −325 mesh.

38. A burned refractory composition having less than 5 ppm total soluble chromium as defined by Environmental Protection Agency Test Method 1311, comprising a starting mix consisting essentially of an at least 98% pure, synthetic, chrome-alumina, alumina-chrome or picrochromite wherein the starting mix is combined with an amount up to 10 wt. % of an additive selected from the group of fine boric acid, carbon black, molybdic oxide and combinations thereof.

39. A method of lowering the soluble chromium content of used refractory to less than 5 ppm total soluble chromium as defined by the Environmental Protection Agency's Test Method 1311, comprising: (a) preparing a starting mixture consisting essentially of used chrome-alumina, alumina-chrome, or picrochromite crushed to small particle size, (b) combining an amount up to 10 wt. % of an additive selected from the group of fine titania, boric acid, carbon black, silica, zircon and molybdic oxide with the starting mixture and, (c) firing to a sufficient temperature to react the additive with soluble chromium compounds present in the starting mixture.

40. The method of claim 39, wherein the additive is sized −65 mesh.

41. The method of claim 39, wherein the additive is sized −325 mesh.

42. A method in accordance with claim 40 wherein the additive and the starting mixture are combined and then pressed before firing.

43. The method of claim 2 wherein the additive is fine silica.

* * * * *